(12) United States Patent
Kato

(10) Patent No.: US 7,187,957 B2
(45) Date of Patent: Mar. 6, 2007

(54) PORTABLE TERMINAL

(75) Inventor: Hideo Kato, Kanagawa (JP)

(73) Assignee: Katoh Electrical Machinery Co., Ltd., Kanagawa (JP)

( * ) Notice: Subject to any disclaimer, the term of this patent is extended or adjusted under 35 U.S.C. 154(b) by 299 days.

(21) Appl. No.: 10/826,649

(22) Filed: Apr. 16, 2004

(65) Prior Publication Data

US 2006/0135228 A1    Jun. 22, 2006

(30) Foreign Application Priority Data

Apr. 23, 2003    (JP) .............................. 2003-118918

(51) Int. Cl.
*H04M 1/00* (2006.01)

(52) U.S. Cl. ................. 455/575.3; 455/575.4; 455/556.1; 361/814; 361/752; 348/376; 348/333.06

(58) Field of Classification Search ............ 455/575.3, 455/575.4, 556.1; 361/814, 752; 348/376, 348/333.06
See application file for complete search history.

(56) References Cited

U.S. PATENT DOCUMENTS

| | | | | |
|---|---|---|---|---|
| 5,661,641 A | * | 8/1997 | Shindo | ........................ 361/814 |
| 6,640,113 B1 | * | 10/2003 | Shim et al. | .................. 455/566 |
| 6,839,576 B2 | * | 1/2005 | Aagaard et al. | ......... 455/575.1 |
| 6,965,413 B2 | * | 11/2005 | Wada | .......................... 348/376 |
| 6,980,735 B2 | * | 12/2005 | Horiguchi | .................... 396/429 |
| 2003/0064758 A1 | * | 4/2003 | Mizuta et al. | .............. 455/566 |
| 2004/0203527 A1 | * | 10/2004 | Matsumoto | ................ 455/90.3 |

* cited by examiner

*Primary Examiner*—Danh Cong Le
(74) *Attorney, Agent, or Firm*—Notaro & Michalos P.C.

(57) ABSTRACT

A portable terminal device includes: a first member having a keyboard operation portion; and a second member having a display portion and attached to the first member via a coupling member movable in a horizontal direction relative to the first member, the second member being movable together with the coupling member in the horizontal direction relative to the first member. The second member is rotatably attached to the coupling member so that a side face or a rear face of the second member is allowed to face forward after the coupling member is moved in the horizontal direction relative to the first member. It is also possible to attach the coupling member to the first member so as to be slidable in one direction or rotatable in the horizontal direction, and to attach the second member to the coupling member to be rotatable in the horizontal direction.

14 Claims, 10 Drawing Sheets

PORTABLE TERMINAL

BACKGROUND OF THE INVENTION

1. Field of the Invention

The present invention relates to a portable terminal device suitable for use as a cellular phone and a pocket computer.

2. Description of the Related Art

In a portable terminal device such as a cellular phone, such a structure is known that a first member having a keyboard operation portion and a microphone portion and a second member having a display portion and a speaker portion are disposed in separate cases, and these cases are coupled to each other via a hinge device so as to be openable/closable relative to each other, or so as to be slidable relative to each other in one direction. As portable terminal devices with such a structure, those disclosed in Japanese Patent Application Laid-open No. 2003-46625 (Patent Document 1) and Japanese Patent Application Laid-open No. 2003-65321 (Patent Document 2) are known.

Patent Document 1 discloses the structure such that a first member having a keyboard operation portion and a second member having a display portion are coupled to each other at end portions thereof via a hinge device so as to be openable/closable, and Patent Document 2 discloses the structure such that a first member having a keyboard operation portion and a second member having a display portion are coupled to each other so as to be slidable relative to each other in one direction via a slide mechanism.

In both of the portable terminal devices of the abovementioned patent documents, the second member cannot change its posture while it is at an open position or at a slided position. This poses a problem of poor operability since it is not possible to direct a camera forward while keeping the first member unmoved if the camera is disposed, for example, on a side face or a rear face of the second member.

There is also a problem, especially in the structure disclosed in Patent Document 2, that a screen gets easily scratched since the display portion is constantly exposed outside.

SUMMARY OF THE INVENTION

It is an object of the present invention to provide a portable terminal device having a first member and a second member that are coupled to each other and structured such that the state of the second member covering the first member and the state of the second member moved in a horizontal direction relative to the first member can be both produced, the portable terminal device characterized in that the second member is further rotatable after moving in the horizontal direction relative to the first member so that a side face or a rear face of the second member can face forward.

In order to achieve the object stated above, the present invention includes a first member in a plane having a keyboard operation portion; a coupling member connected to said first member so as to be movable in said plane: and a second member pivotally attached to said coupling member and movable into a pivotally supporting position to allow a side face and/or rear face of said second member to be directed forward relative to said coupling member, said second member having a display portion on a front face and a lens portion of a camera on the side face and/or rear face; wherein said pivotally supporting position of said second member is a position that said second member can rotate relative to said coupling member about a pivot axis parallel to said plane, and after said coupling member moves said second member in said plane relative to said first member to said pivotally supporting position, said first member and said second member lie along a straight line.

The invention may further include a rotating means with a friction mechanism for attaching said second member to the coupling member so as to be frictionally rotatable relative to said coupling member. In an embodiment, the friction mechanism comprises a shaft mutually rotatably connected with said coupling member and said second member; a washer interposed between said coupling member and said second member by inserting said washer onto said shaft through an insertion hole thereof; a first friction washer engaged with said coupling member by inserting said first friction washer onto said shaft through a through hole thereof; a flat washer engaged with said shaft by insert said flat washer onto said shaft through a deformable insertion hole thereof; a second friction washer engaged with said flat washer by inserting said second friction washer onto said shaft through a hole thereof and by interposing said second friction washer between said first friction washer and said flat washer; and a clamping nut screw-fitted to a male screw portion of said shaft and abutting with said flat washer.

Further, in the present invention, the coupling member is attached to said first member to be slidable in one direction when the coupling member is attached to the first member to be movable in the horizontal direction relative to said first member.

The present invention may further include a slide mechanism with a pressing means for slidably attaching the coupling member to the first member so as to be slidable relative to said coupling member. In an embodiment, the pressing means comprises a hinge case fixedly inserted in a housing hole provided in said coupling member; a ball bearing mounted at one end of said hinge case so as to be rotatable and so as not to slide out of said hinge case, said ball bearing partially protrudes from said housing hole to create pressure contact with a top face of said first member; a seat member slidably housed in said hinge case and contacting said ball bearing; and a compression spring resiliently interposed between said seat member and a back portion of said hinge case.

Further, in the present invention, the coupling member is attached to the first member to be rotatable in the horizontal direction when the coupling member is attached to the first member to be movable in the horizontal direction relative to said first member.

The present invention may further include a rotating means with a friction mechanism for attaching the coupling member to the first member to be frictionally rotatable in the horizontal direction relative to the first member. In an embodiment, the friction mechanism comprises a shaft rotatably mutually connected with said coupling member and said first member; a washer interposed between said coupling member and said first member by inserting through said washer onto said shaft through an insertion hole thereof; a first friction washer engaged with said coupling member by inserting said first friction washer onto said shaft through a through hole thereof; a flat washer engaged with said shaft by inserting onto said flat washer onto said shaft through a deformable insertion hole thereof; a second friction washer engaged with said flat washer by inserting said second friction washer onto said shaft through a through hole thereof and by interposing said second friction washer between said first friction washer and said flat washer; and a clamping nut screw-fitted to a male screw portion of said shaft and abutting with said flat washer.

Further, in the present invention, a shaft for attaching said second member to said coupling member so as to be rotatable relative to said coupling member comprises a through hole provided in an axial direction thereof and a lead wire passes through an internal part of the through hole.

Moreover, in the present invention, the second member may have a camera provided on a side face and/or a rear face thereof, in addition to the display portion provided on a front face thereof.

DETAILED DESCRIPTION OF THE PREFERRED EMBODIMENTS

Figure 1:
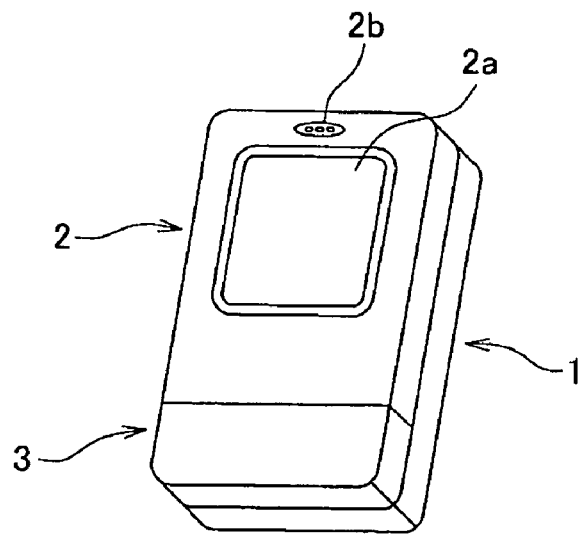
FIG. 1 is a perspective view schematically showing a portable terminal device according to the present invention.

Hereinafter, a cellular phone as an embodiment of the present invention will be described, but the present invention may also be embodied as other portable terminals such as a pocket computer. From FIG. 1 to FIG. 9, the reference numeral 1 denotes a first member having a keyboard operation portion 1a and a microphone portion 1b. The reference numeral 2 denotes a second member having a display portion 2a and a speaker portion 2b provided on a front face side thereof and a lens portion 2c of a camera such as, for example, a CCD camera provided on a rear face side thereof. Incidentally, the lens portion 2c may be disposed on a side face. The second member 2 is attached to the first member 1 via a coupling member 3 to be slidable in one direction relative to the first member 1, and is also rotatably attached to the coupling member 3 via a later-described rotating means.

Figure 4:
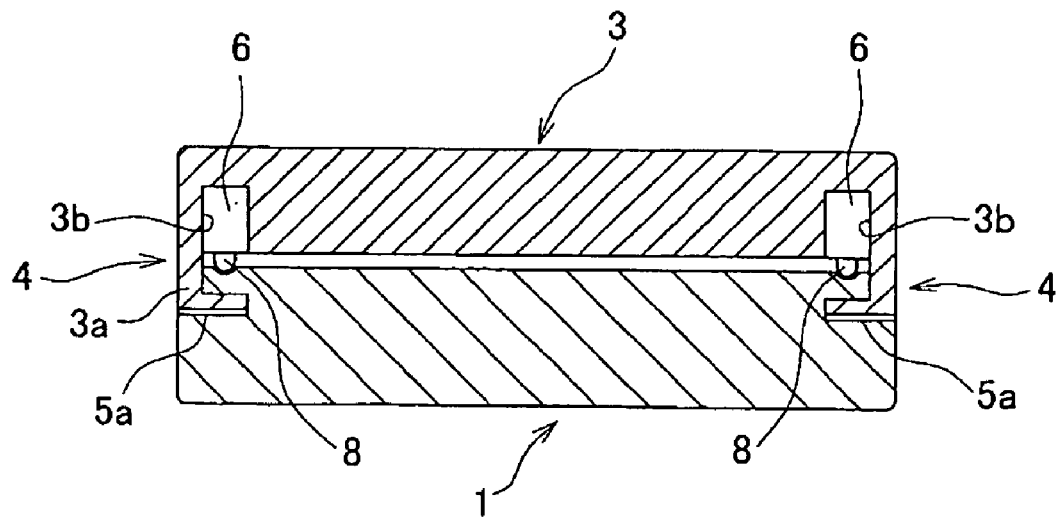
FIG. 4 is an enlarged vertical cross-sectional view to explain a slide mechanism portion of a coupling member.
Figure 5:
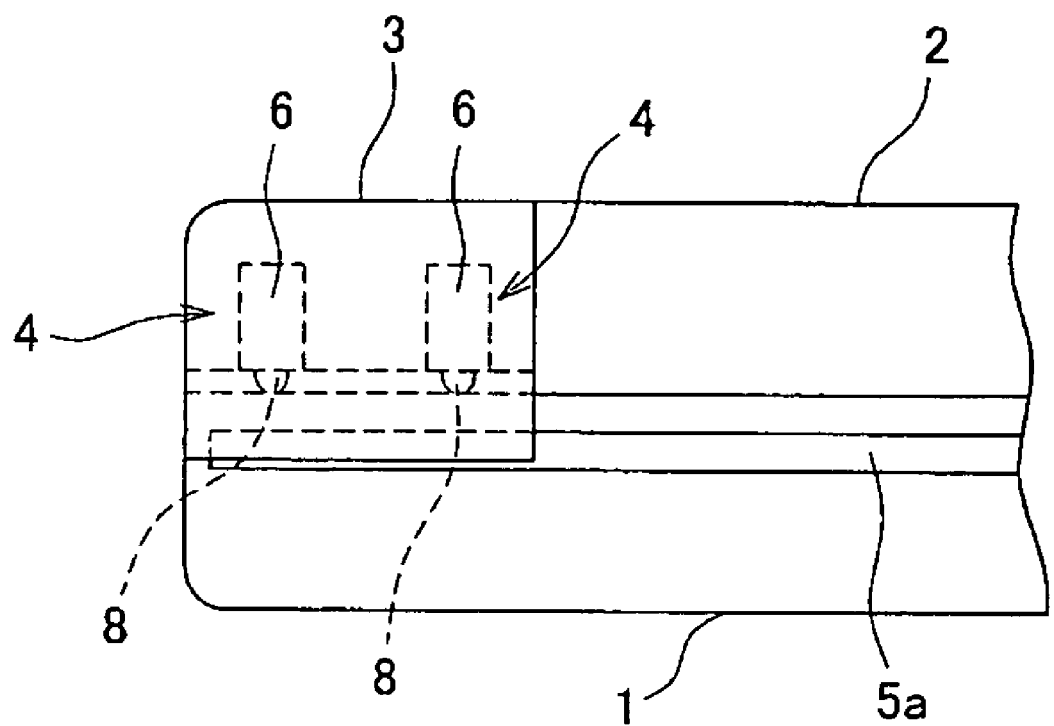
FIG. 5 is a right side view to explain the slide mechanism portion of the coupling member.

As shown in, for example, FIG. 4 and FIG. 5, a slide mechanism 4 for slidably attaching the coupling member 3 to the first member 1 is structured such that guide grooves 5a, 5a are formed in a longitudinal direction on both sides of a case constituting the first member 1 and curved portions 3a, 3a of the coupling member 3 each having a cross section in a substantially C-channel shape are fitted in the guide grooves 5a, 5a. This structure prevents the detachment of the coupling member 3 from the first member 1, and pressing means 6 attached to the coupling member 3 side ensure a secure and smooth sliding movement.

Figure 6:
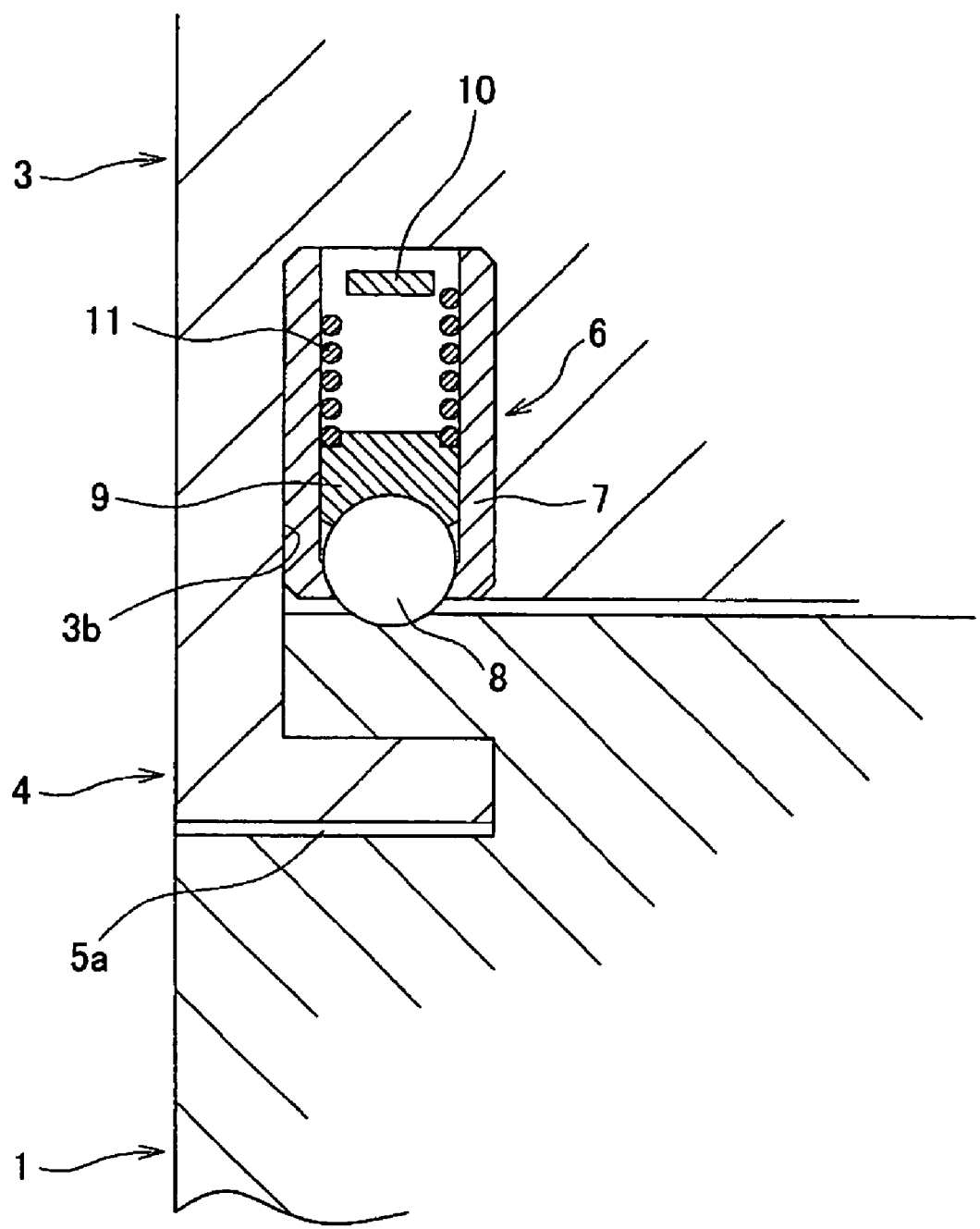
FIG. 6 is an enlarged cross-sectional view to explain the structure of a pressing means of the slide mechanism of the coupling member.

Each of the pressing means 6 is structured such that, as shown in FIG. 6 in particular, a ball bearing 8 is attached at one end of a hinge case 7 fixedly inserted in a housing hole 3b provided in the coupling member 3, so as to be rotatable and so as not to come off outward, and the ball bearing 8 protrudes from the housing hole 3b to be in pressure contact with a top face of the first member 1. Incidentally, a guide groove for guiding the ball bearing 8 may be formed on the top face of the first member 1. Further, the position where the pressing means 6 is attached is not limited to that shown in the drawing.

The ball bearing 8 is supported by a seat member 9 slidably housed in the hinge case 7, and a compression spring 11 resiliently interposed between the seat member 9 and a stopper member 10 attached at a back portion of the hinge case 7 biases the ball bearing 8 together with the seat member 9 outward from the hinge case 7. Incidentally, this ball bearing 8 may be replaced by a pin or the like.

Figure 7:
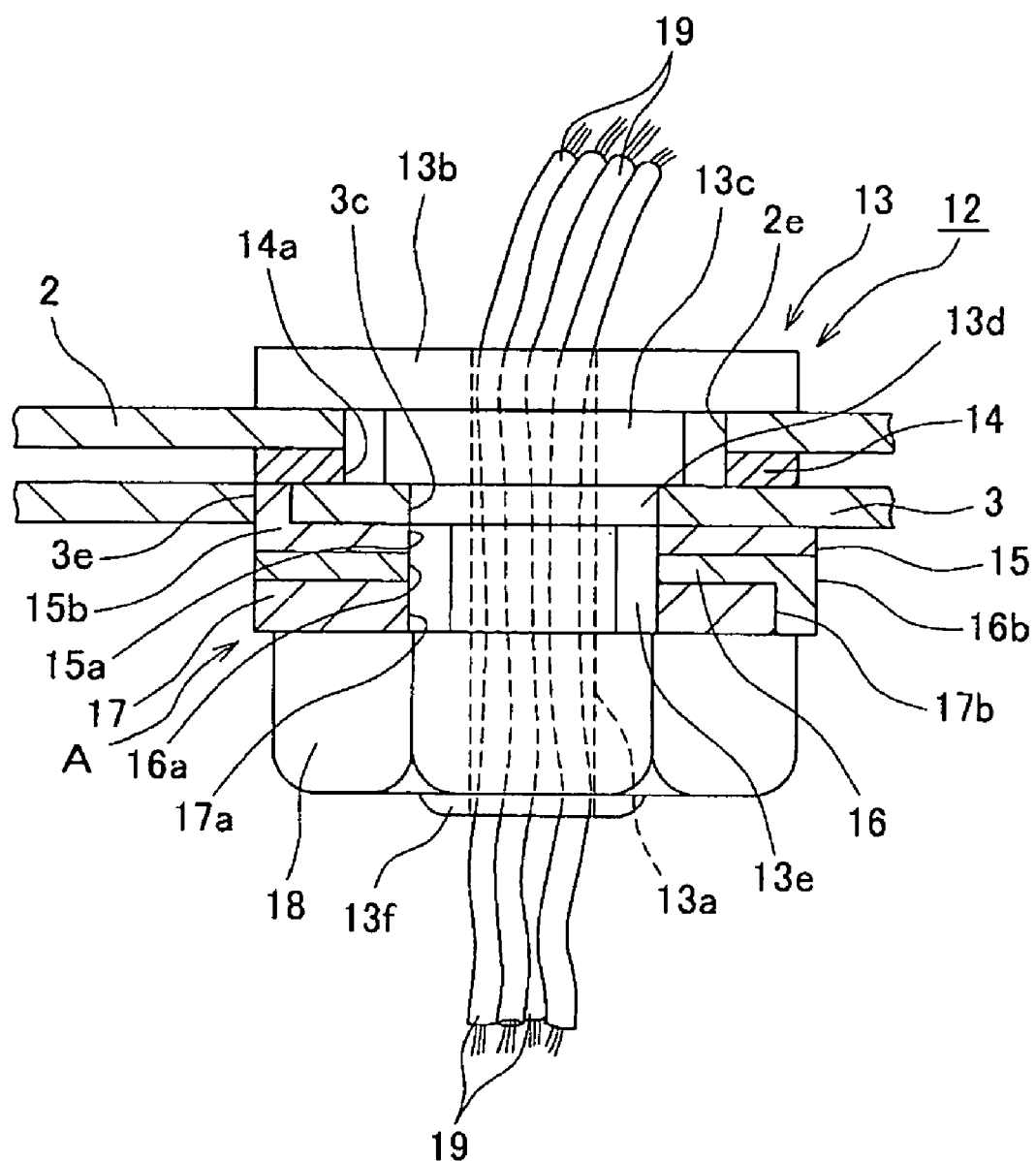
FIG. 7 is an enlarged cross-sectional view to explain the structure of a rotating means of a second member.

A rotating means 12 for rotatably attaching the second member 2 to the coupling member 3 has a friction mechanism A as shown in, for example, FIG. 7. This friction mechanism A is composed of a shaft 13, a washer 14, first and second friction washers 15, 16, a flat washer 17, and a clamping nut 18. The shaft 13 is composed of a flange portion 13b, a deformable mounting portion 13c, a small-diameter portion 13d, a deformable portion 13e, and a male screw portion 13f, and the shaft 13 further has a through hole 13a provided in an axial direction at a center portion thereof so that it is hollow. The washer 14 is interposed between the second member 2 and the coupling member 3, with the deformable mounting portion 13c of the shaft 13 being engageably inserted to a deformable mounting hole 2e provided on a side of the case of the second member 2 and with the shaft 13 being inserted through an insertion hole 14a thereof provided in the axial direction at a center portion thereof. The first friction washer 15 and the second friction washer 16 are disposed with the small-diameter portion 13d of the shaft 13 being inserted through mounting holes 3c provided on the coupling member 3 side and with the small-diameter portion 13d being also inserted through insertion holes 15a, 16a provided in the axial direction at a center portions thereof. The flat washer 17 has a deformable insertion hole 17a provided in the axial direction at a center portion thereof, and through the deformable insertion hole 17a, the deformable portion 13e of the shaft 13 is engageably inserted. The clamping nut 18 is screw-fitted to the male screw portion 13f. Note that the first friction washer 15 has a lock piece 15b and the rotation of the first friction washer 15 is restrained by the second member 2 when the lock piece 15b is locked in a lock groove 3e provided on the coupling member 3 side, and the second friction washer 16 has a lock piece 16b and the rotation of the second friction washer 16 is restrained by the shaft 13 when the lock piece 16b is locked in a lock groove 17b provided in the flat washer 17 side. Further, lead wires 19 electrically or optically connecting the first member 1 and the second member 2 are inserted through the through hole 13a of the shaft 13.

Therefore, when the cellular phone is not in use, the coupling member 3 is positioned on a lower side in the drawing of the top face of the first member 1 so that the second member 2 covers the top face of the first member 1 as shown in FIG. 1.

Figure 2:
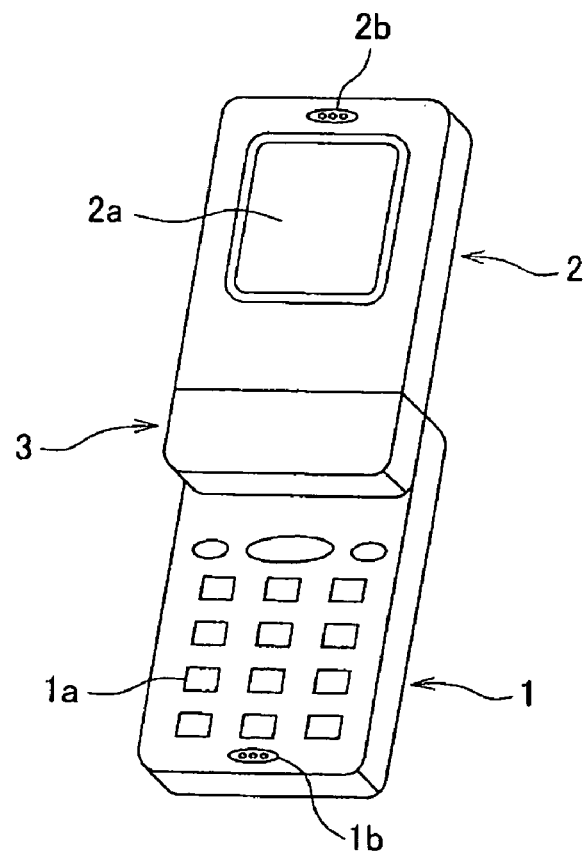
FIG. 2 is a perspective view to explain the operation of the portable terminal device shown in FIG. 1.

When the first member 1 is held with one hand and the coupling member 3 is pushed with the thumb of this hand or with the other hand from this state, the coupling member 3 slides forward via the slide mechanism 4, so that the keyboard operation portion 1a and the microphone portion 1b of the first member 1 are exposed as shown in FIG. 2, which is a standby state for use.

Figure 3:
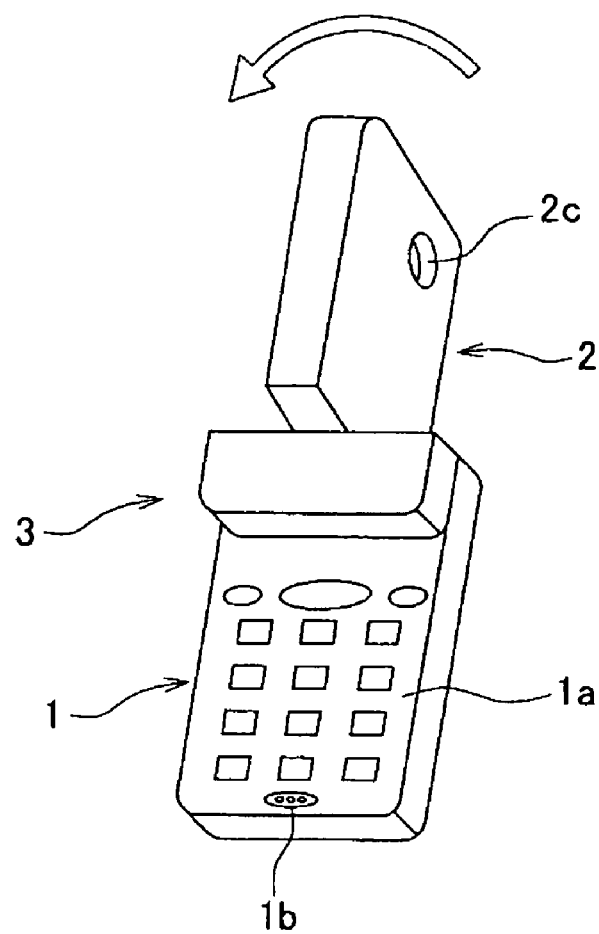
FIG. 3 is similarly a perspective view to explain the operation of the portable terminal device shown in FIG. 1.
Figure 8:
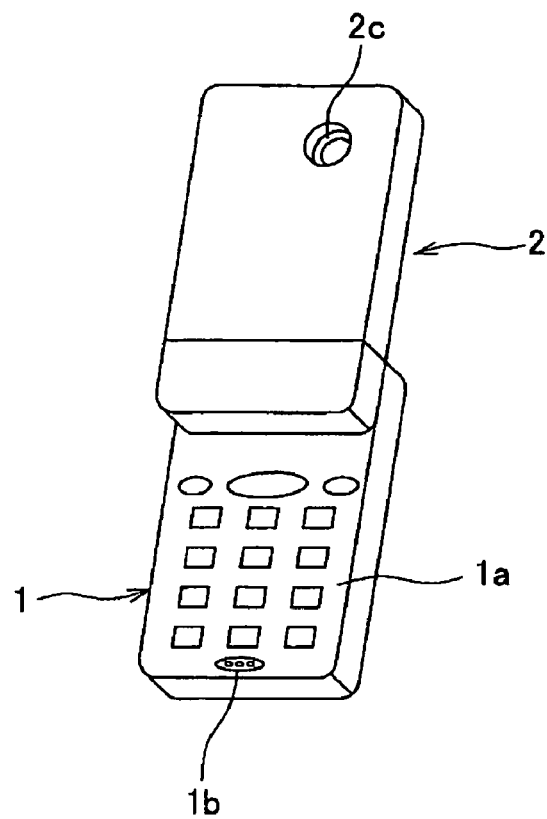
FIG. 8 is a perspective view to explain the operation of the portable terminal device shown in FIG. 1.

When the second member 2 is twisted from the state shown in FIG. 2 relative to the coupling member 3, the second member 2 rotates relative to the coupling member 3 via the rotating means 12, and the second member 2 is capable of rotating 90° as shown in FIG. 3 or 180° as shown in FIG. 8.

The rotation of the second member 2 relative to the coupling member 3 can be click-stopped at 90° and is stopped at 180° by a stopper. A known click stopper and stopper provided in the rotating means 12 may be used, and moreover, the stopper in particular may be constituted of protruding portions formed on respective coupling end sides of the second member 2 and the coupling member 3.

As for the rotation operation, it is preferable that the second member 2 is not continuously rotated in the same direction but rotated in a reverse direction to return to its original position after 180 degree rotation, especially in a case where the lead wires 19 are inserted through the through hole 13a of the shaft 13.

In a case where a lens portion 2c of a camera is also attached on the side face of the second member 2, the lens portion 2c can be directed forward after the second member 2 is rotated 90 degree relative to the coupling member 3 as shown in FIG. 3. In a case where the lens portion 2c is attached on the rear face of the second member 2, the lens portion 2c can be directed forward after the second member 2 is rotated 180 degree relative to the coupling member 3 as shown in FIG. 8.

Figure 9:
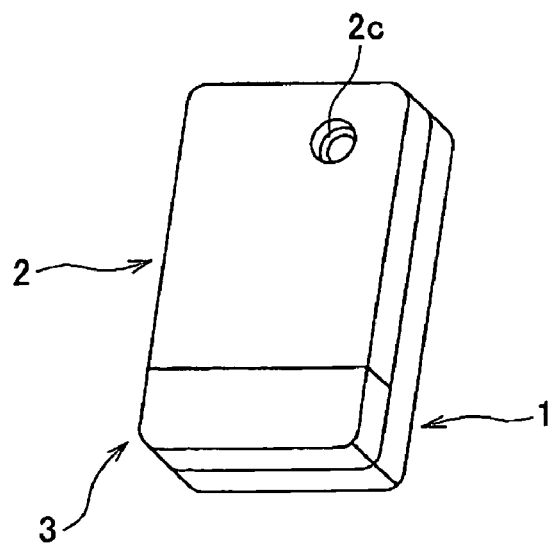
FIG. 9 is similarly a perspective view to explain the operation of the portable terminal device shown in FIG. 1.

Further, it is possible to slide the coupling member 3 toward the lower side in the drawing relative to the first member 1, thereby returning the second member 2 to its original position, as shown in FIG. 9, from the 180° rotated state relative to the coupling member 3 shown in FIG. 8. In this case, since the display portion 2a is not exposed to a front face side, the front face thereof can be protected.

FIG. 10 to FIG. 16 show another embodiment. This embodiment is the same as the above-described embodiment in that a first member 20 has a keyboard operation portion 20a and a microphone portion 20b, a second member 21 has a display portion 21a and a speaker portion 21b, the second member 21 is attached to the first member 20 via a coupling member 22, and the second member 21 is rotatably attached to the coupling member 22.

However, this embodiment is different from the above-described embodiment in that the coupling member 22 is attached to the first member 20 to be rotatable in a horizontal direction.

The same rotating means as that in the above-described embodiment is usable as rotating means for allowing the coupling member 22 to rotate relative to the first member 20 and for allowing the second member 21 to rotate relative to the coupling member 22. It should be noted that the above-described slide mechanism and rotating means are only examples. They are not limited to those described above, and may be replaced by other mechanisms having various known structures.

Figure 10:
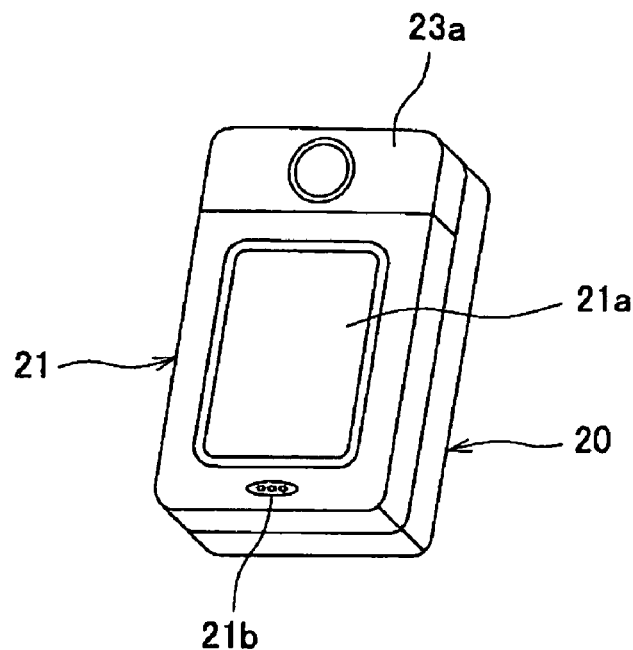
FIG. 10 is a perspective view schematically showing another embodiment of the portable terminal device according to the present invention.

In this second embodiment, when the cellular phone is not in use, the coupling member 22 is positioned on an end side of a top face of the first member 20 and the second member 21 covers the top face of the first member 20 as shown in FIG. 10.

Figure 11:
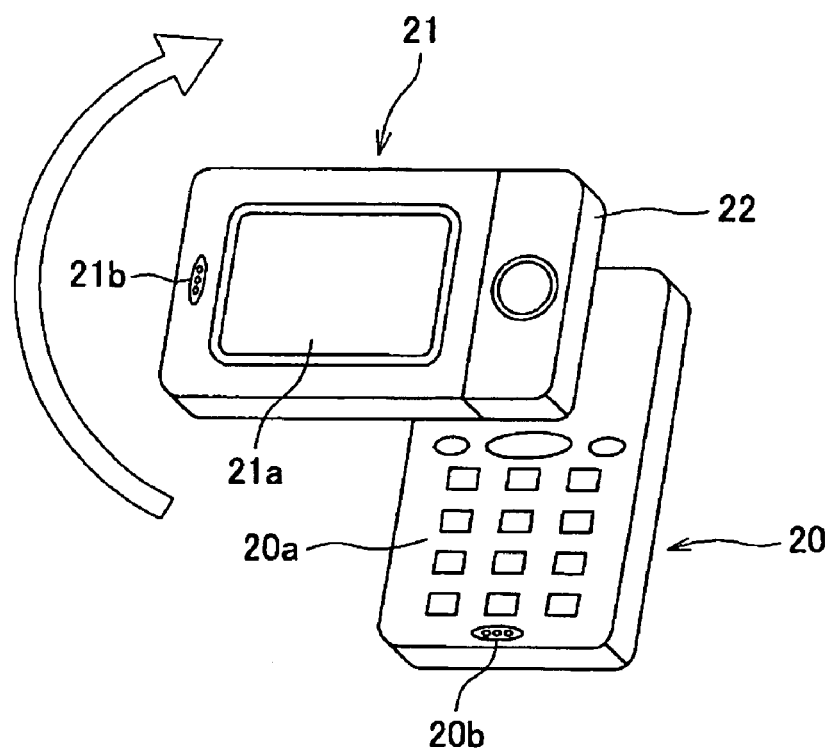
FIG. 11 is a perspective view to explain the operation of the portable terminal device shown in FIG. 10.
Figure 12:
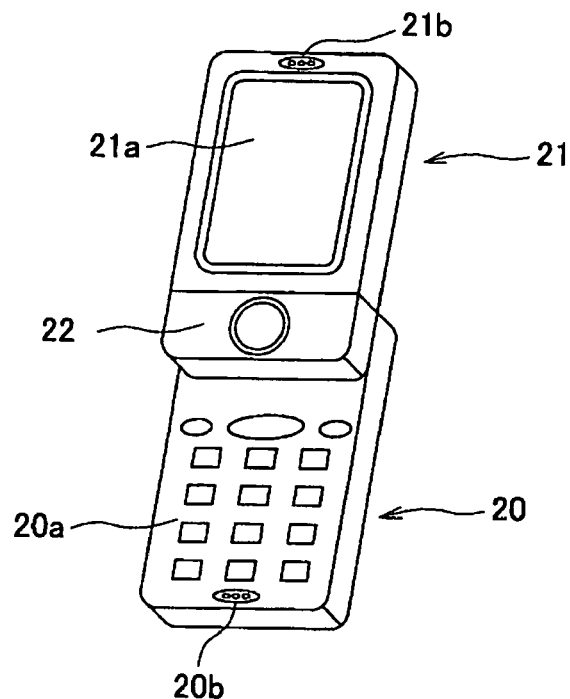
FIG. 12 is a perspective view to explain the operation of the portable terminal device shown in FIG. 10.

When the first member 20 is held with one hand and the second member 21 is pushed leftward with the thumb of this hand or with the other hand from this state, the coupling member 22 horizontally rotates in a right direction via a not-shown rotating means, so that the keyboard operation portion 20a and the microphone portion 20b of the first member 20 are exposed and the second member 21 is brought into a 90° rotated state as shown in FIG. 11 or into a 180° rotated state as shown in FIG. 12 relative to the first member 20, which is a standby state for use.

Figure 13:
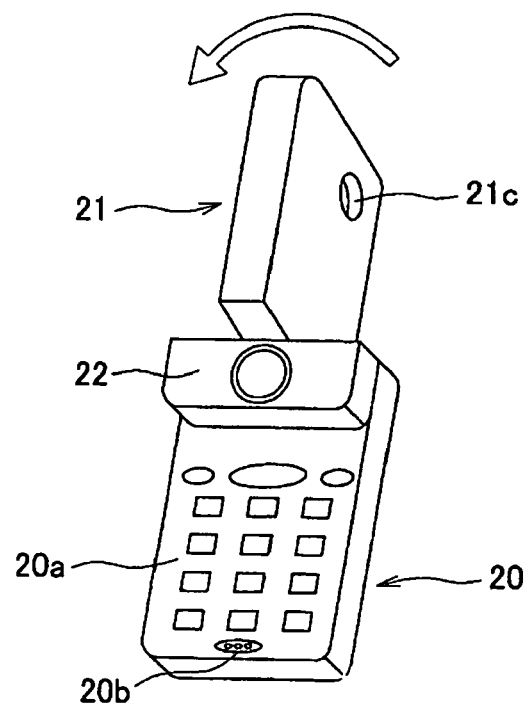
FIG. 13 is a perspective view to explain the operation of the portable terminal device shown in FIG. 10.
Figure 14:
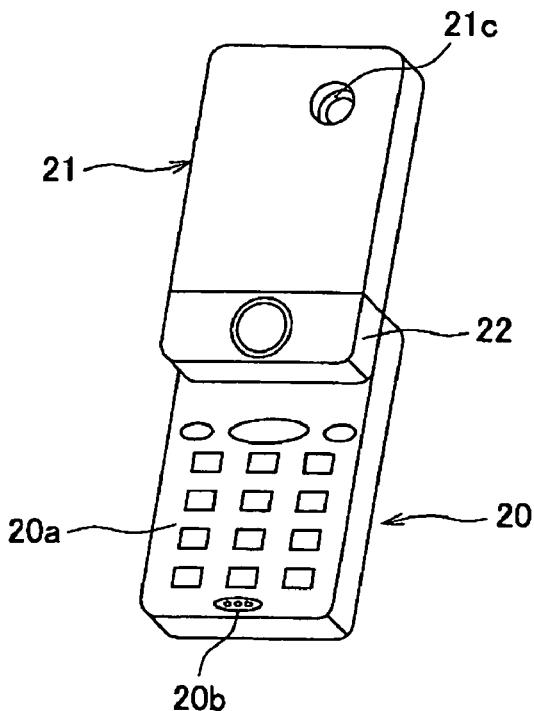
FIG. 14 is a perspective view to explain the operation of the portable terminal device shown in FIG. 10.

When the second member 21 is twisted relative to the coupling member 22 from this state, the second member 21 rotates relative to the coupling member 22 via a not-shown rotating means, so that the second member is capable of rotating 90° as shown in FIG. 13 or 180° as shown in FIG. 14.

The rotation of the second member 21 relative to the coupling member 22 can be click-stopped at 90° and is stopped at 180° by a stopper. A known click stopper and stopper provided in the rotating means may be used as these click stopper and stopper, and moreover, the stopper may be constituted of protruding portions formed on respective coupling end sides of the second member 21 and the coupling member 22.

As for the rotation operation, it is preferable that the second member 21 is not continuously rotated in the same direction but rotated in a reverse direction to return to its original position after 180 degree rotation, especially in a case where the lead wires 19 are inserted through the through hole 13a of the shaft 13 as shown in FIG. 7.

In a case where a lens portion of a camera is also attached on the side face of the second member 21, the camera can be directed forward after the second member 21 is rotated 90 degree relative to the coupling member 22 as shown in FIG. 13. In a case where a lens portion is attached on the rear face of the second member 21, the lens portion 21c can be directed forward after the second member 21 is rotated 180 degree relative to the coupling member 22 as shown in FIG. 14.

Figure 15:
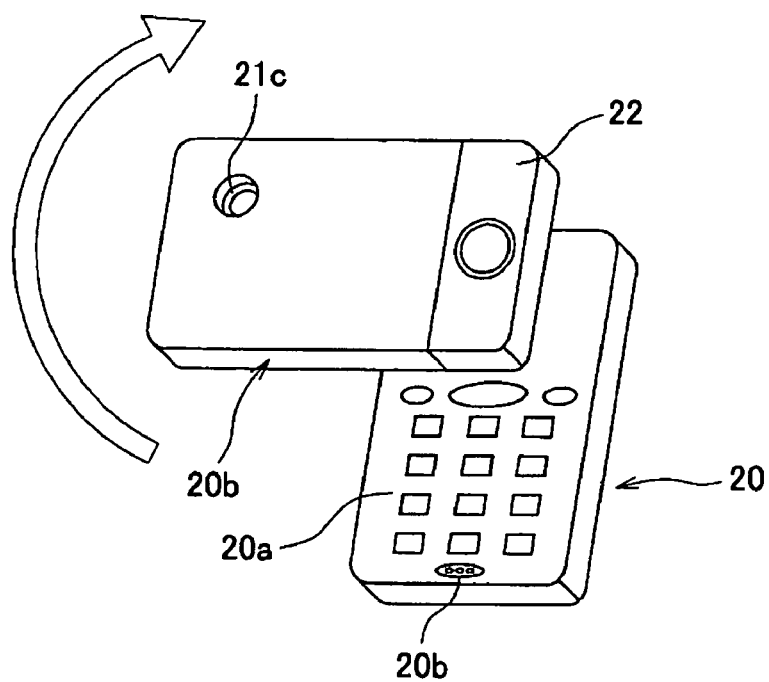
FIG. 15 is a perspective view to explain the operation of the portable terminal device shown in FIG. 10.
Figure 16:
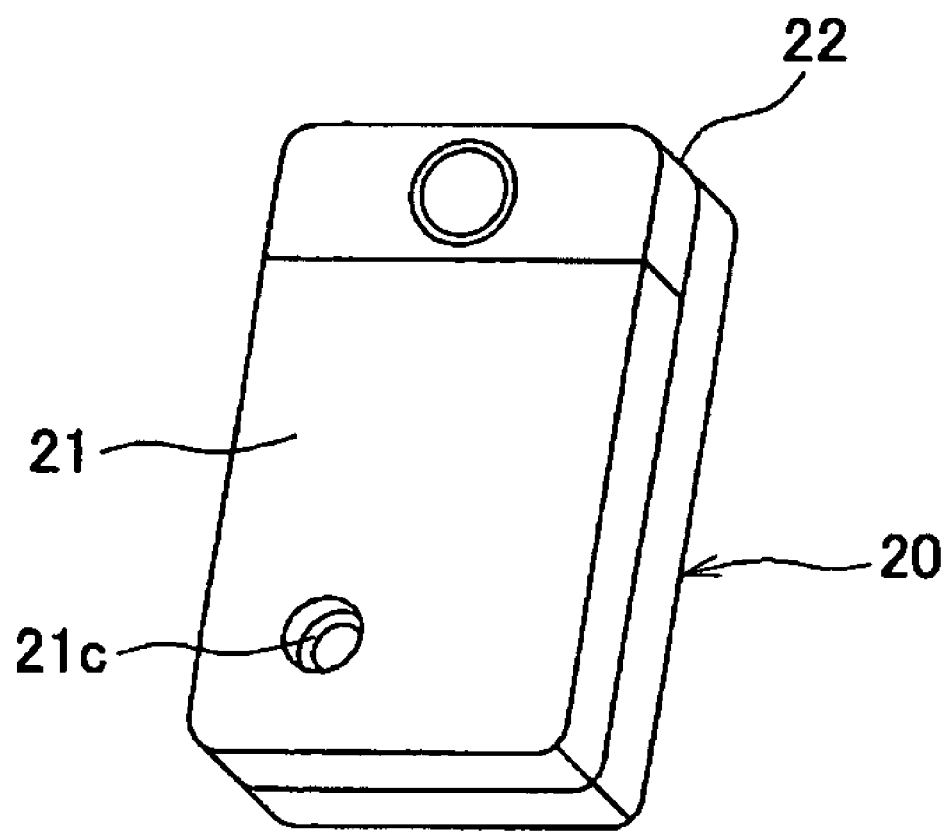
FIG. 16 is a perspective view to explain the operation of the portable terminal device shown in FIG. 10.

Further, it is possible to rotate the coupling member 22 in a reverse direction relative to the first member 20, thereby returning the second member 21 to its original position, as shown in FIG. 15 and FIG. 16 from the 180° rotated state relative to the coupling member 22 shown in FIG. 14.

What is claimed is:

1. A portable terminal device comprising:
   a first member in a plane having a keyboard operation portion;
   a coupling member connected to said first member so as to be movable in said plane;
   a second member pivotally attached to said coupling member and movable into a pivotally supporting position to allow a side face and/or rear face of said second member to be directed forward relative to said coupling member, said second member having a display portion on a front face and a lens portion of a camera on the side face and/or rear face; and a rotating means with a friction mechanism for rotatably attaching said second member to said coupling member so as to be frictionally rotatable relative to the coupling member, wherein said pivotally supporting position of said second member is a position that said second member can rotate through said rotating means relative to said coupling member about a pivot axis parallel to said plane, and after said coupling member moves said second member in said plane relative to said first member to said pivotally supporting position, said first member and said second member lie along a straight line.

2. The portable terminal device according to claim 1, wherein said friction mechanism comprises:
a shaft mutually rotatably connected with said coupling member and said second member;
a washer interposed between said coupling member and said second member by inserting said washer onto said shaft through an insertion hole thereof;
a first friction washer engaged with said coupling member by inserting said first friction washer onto said shaft through a through hole thereof;
a flat washer engaged with said shaft by insert said flat washer onto said shaft through a deformable insertion hole thereof;
a second friction washer engaged with said flat washer by inserting said second friction washer onto said shaft through a hole thereof and by interposing said second friction washer between said first friction washer and said flat washer; and
a clamping nut screw-fitted to a male screw portion of said shaft and abutting with said flat washer.

3. The portable terminal device according to claim 2, wherein a shaft for attaching said second member to said coupling member so as to be rotatable relative to said coupling member comprises a through hole provided in an axial direction thereof and a lead wire passes through an internal part of the through hole.

4. The portable terminal device according to claim 1, wherein said coupling member is attached to said first member and is slidable with respect to said first member in a linear direction.

5. The portable terminal device according to claim 4, further comprising a slide mechanism with a pressing means for slidably attaching said coupling member to said first member,
wherein said pressing means comprises:
a hinge case fixedly inserted in a housing hole provided in said coupling member;
a ball bearing mounted at one end of said hinge case so as to be rotatable and so as not to slide out of said hinge case, said ball bearing partially protrudes from said housing hole to create pressure contact with a top face of said first member;
a seat member slidably housed in said hinge case and contacting said ball bearing; and
a compression spring resiliently interposed between said seat member and a back portion of said hinge case.

6. The portable terminal device according to claim 1, wherein said coupling member is attached to said first member and is rotatable with respect to said first member.

7. The portable terminal device according to claim 6, further comprising a rotating means with a friction mechanism for attaching said coupling member to said first member to be rotatable in the plane,
wherein said friction mechanism comprises:
a shaft rotatably mutually connected with said coupling member and said first member;
a washer interposed between said coupling member and said first member by inserting through said washer onto said shaft through an insertion hole thereof;
a first friction washer engaged with said coupling member by inserting said first friction washer onto said shaft through a through hole thereof;
a flat washer engaged with said shaft by inserting onto said flat washer onto said shaft through a deformable insertion hole thereof;
a second friction washer engaged with said flat washer by inserting said second friction washer onto said shaft through a through hole thereof and by interposing said second friction washer between said first friction washer and said flat washer; and
a clamping nut screw-fitted to a male screw portion of said shaft and abutting with said flat washer.

8. The portable terminal device according to claim 7, wherein a shaft for attaching said first member to said coupling member so as to be rotatable relative to said coupling member comprises a through hole provided in an axial direction thereof and a lead wire passes through an internal part of the through hole.

9. A portable terminal device comprising:
a first member having a keyboard operation portion;
a coupling member slidably mounted on said first member;
a second member rotatably mounted on said coupling member, said second member having a display portion provided on a front face and a lens portion of a camera provided on at least one of a side face and a rear face; and
A rotating assembly for rotatably attaching said second member to said coupling member, said rotating assembly comprises a friction mechanism,
wherein said coupling member moves said second member between a retracted position and an extended position, and in the extended position, said second member is rotatable with respect to said first member and coupling member.

10. The portable terminal device according to claim 9, wherein said friction mechanism comprises:
a shaft mutually rotatably connecting said coupling member and said second member;
a washer mounted on said shaft through an insertion hole thereof and interposed between said coupling member and said second member;
a first friction washer mounted on said shaft through a through hole thereof and engaged with said coupling member;
a flat washer mounted on said shaft through a deformable insertion hole thereof and engaged with said shaft;
a second friction washer mounted on said shaft through a through hole thereof and engaged with said flat washer, said second friction washer being interposed between said first friction washer and said flat washer; and
a clamping nut screw-fitted to a male screw portion of said shaft and abutting said flat washer.

11. The portable terminal device according to claim 9, wherein said device comprises a slide mechanism for slidably attaching said coupling member to said first member, said slide mechanism comprises a pressing means, wherein said pressing means comprises:
a hinge case fixedly inserted in a housing hole provided in said coupling member;

a ball bearing mounted at one end of said hinge case so as to be rotatable and so as not to slide out of said hinge case, said ball bearing partially protrudes from said housing hole to create pressure contact with a top face of said first member;

a seat member slidably housed in said hinge case and contacting said ball bearing; and a compression spring resiliently interposed between said seat member and a back portion of said hinge case.

12. A portable terminal device comprising:

a first member having a keyboard operation portion;

a coupling member pivotally mounted on said first member; and a second member rotatably mounted on said coupling member, said second member having a display portion provided on a front face and a lens portion of a camera provided on at least one of a side face and a rear face; and A rotating assembly for rotatably attaching said coupling member to said first member, said rotating assembly comprises a friction mechanism, wherein said coupling member pivots said second member between a retracted position and an extended position, and in the extended position, said second member is rotatable with respect to said first member and coupling member.

13. The portable terminal device according to claim 12, wherein said friction mechanism comprises:

a shaft mutually rotatably connecting said coupling member and said first member;

a washer mounted on said shaft through an insertion hole thereof and interposed between said coupling member and said first member;

a first friction washer mounted on said shaft through a through hole thereof and engaged with said coupling member;

a flat washer mounted on said shaft through a deformable insertion hole thereof and engaged with said shaft;

a second friction washer mounted on said shaft through a through hole thereof and engaged with said flat washer, said second friction washer being interposed between said first friction washer and said flat washer; and a clamping nut screw-fitted to a male screw portion of said shaft and abutting said flat washer.

14. The portable terminal device according to claim 12, wherein a shaft for attaching said first member to said coupling member so as to be rotatable relative to said coupling member comprises a through hole provided in an axial direction thereof and a lead wire passes through an internal part of the through hole.

* * * * *